(12) United States Patent
McMahan

(10) Patent No.: US 8,091,922 B2
(45) Date of Patent: Jan. 10, 2012

(54) TRAILER JACK CAPABLE OF RAPID GROSS AND INCREMENTAL ADJUSTMENTS IN THE HEIGHT OF A TRAILER

(76) Inventor: Dale McMahan, Sulphur Springs, TX (US)

( * ) Notice: Subject to any disclaimer, the term of this patent is extended or adjusted under 35 U.S.C. 154(b) by 308 days.

(21) Appl. No.: 12/552,446

(22) Filed: Sep. 2, 2009

(65) Prior Publication Data

US 2010/0066068 A1 Mar. 18, 2010

Related U.S. Application Data

(60) Provisional application No. 61/192,038, filed on Sep. 15, 2008.

(51) Int. Cl.
*B60S 9/02* (2006.01)
(52) U.S. Cl. ..................... 280/766.1; 254/420
(58) Field of Classification Search ............... 280/763.1, 280/766.1, 475; 254/418, 420, 424, 425
See application file for complete search history.

(56) References Cited

U.S. PATENT DOCUMENTS

| | | | | |
|---|---|---|---|---|
| 3,595,527 A | * | 7/1971 | Douglass | 254/420 |
| 4,176,824 A | * | 12/1979 | Linton et al. | 254/423 |
| 4,238,113 A | * | 12/1980 | Adams | 254/425 |
| 4,796,864 A | * | 1/1989 | Wilson | 254/425 |
| 4,842,252 A | * | 6/1989 | McMahan | 327/108 |
| 6,623,035 B1 | * | 9/2003 | Schneider | 280/766.1 |

* cited by examiner

*Primary Examiner* — John Walters
(74) *Attorney, Agent, or Firm* — John Scott Carlson

(57) ABSTRACT

A trailer jack capable of rapid gross and incremental adjustments in height adapted for attachment to a trailer. The jack is comprised of an inner member nested within an outer member, a collar, a housing and a pin. The inner member is threadably connected to the outer member with a bolt having a crank attached at one end. The bolt enables incremental adjustments in the trailer height by extension and retraction of the inner member with respect to the outer member. The connected outer and inner members are secured to the trailer with a pin inserted through the housing, a hole in the collar and one of a plurality of longitudinal holes in the outer member. To create rapid gross adjustments in the trailer height, the pin is retracted, a different hole in the outer member is registered with the hole in the collar and the pin re-inserted.

10 Claims, 4 Drawing Sheets

US 8,091,922 B2

TRAILER JACK CAPABLE OF RAPID GROSS AND INCREMENTAL ADJUSTMENTS IN THE HEIGHT OF A TRAILER

BACKGROUND

1. Technical Field

The disclosure relates to a multi element trailer jack capable of being configured for and enabling rapid gross and incremental adjustments in the height of a trailer.

2. Background

Many trailers have jacks that enable individuals operating the trailer to hitch and unhitch the trailer from the towing vehicle. Typically, such trailers are used for boats, campers and other similar towed vehicles. The trailer jacks are customarily rigidly fixed to the trailer, often by welded or bolted connections and have used a threaded mechanism advanced by a crank to achieve the adjustments in height needed for operation of the trailer. In attaching the trailer to the towing vehicle, elements of the jack must first be extended to the ground, the tongue of the trailer then raised above the hitch mechanism on the towing vehicle through application of a cranking or rotational movement to the threaded mechanism that operationally raises the trailer tongue and, once situated over the hitch mechanism of the towing vehicle, the tongue of the trailer is lowered into place so that the trailer may be coupled to the hitch mechanism of the towing vehicle by reversing the same rotational or cranking application to the threaded mechanism. To unhitch the trailer, the reverse steps are needed. In preparation for actual transport, the element of the jack extending from the trailer to the ground must be substantially retracted to provide adequate clearance between the roadway and the lower portion of the jack during travel. See U.S. Pat. No. 4,842,252 which is incorporated herein by reference for further discussion, the disadvantages of the threaded mechanisms for rapid adjustments in height and the effort needed by an operator to make the height adjustments necessary to couple and uncouple a towing vehicle and a trailer with a threaded mechanism alone.

BRIEF SUMMARY

One embodiment is directed to a trailer jack capable of enabling rapid gross and incremental adjustments in height of a trailer and adaptable for attachment to a trailer, comprising a collar attached to and oriented perpendicular to the horizontal plane of a trailer. The collar contains a bored hole. This embodiment further includes an elongated hollow outer member having i) an enclosed end forming a cavity, ii) a total cross section smaller than and defined by the cross section of the interior of the collar so that the elongated hollow outer member slides freely through the collar, iii) a hole in the enclosed end smaller in diameter than any dimension of the inner cross section and iv) a plurality of longitudinally aligned holes whose diameters equal the diameter of the bored hole in the collar. The longitudinally aligned holes are situated so that when the outer member is inserted in the collar, each of the longitudinally aligned holes is capable of coincidence with the bored hole in the collar with proper vertical adjustment of the outer member. This embodiment further includes a threaded bolt with a handle located at one end. The bolt has a diameter smaller than the diameter of the hole in the enclosed end of the outer member. The handle is positioned exterior to the outer member and the bolt inserted through the hole in the enclosed end of the outer member and extended longitudinally within the cavity of the outer member. This embodiment further comprises an elongated hollow inner member having i) a total cross section smaller than and defined by the cross section of the cavity of the outer member so that the inner member may is slideable within the cavity of the outer member, and ii) a threaded connection proximate to one end enabling the inner member to be threadably connected to the outer member by first inserting the end of the inner member containing the threaded connection in the outer member and engaging the threaded connection with the bolt and, by rotation of the handle, operatively enabling the inner member to be extended or retracted relative to the outer member. This embodiment further comprises a hollow housing with an inner diameter equal to the diameter of the bored hole in the collar. The housing is attached to collar such that that the longitudinal axis of the housing intersects the centerpoint of the bored hole in the collar and is orthogonal to the radial vector of the bored hole in the collar. This embodiment further comprises a pin having a diameter less than the inner diameter of the housing such that the pin may be slideably received in the housing. The pin operatively enables the threadably connected inner member and outer member to be collectively secured to the trailer by aligning one of the plurality of longitudinally aligned holes in the outer member with the bored hole in the collar and into the longitudinally aligned holes in the outer member and operatively enables the threadably connected inner and inner members to be adjusted vertically relative to the trailer by extraction of the pin and repositioning of one of the longitudinally aligned holes in the outer member to coincide with the bored hole in the collar and and re-insertion of the pin.

Another embodiment is directed to a trailer jack capable of enabling rapid gross and incremental adjustments in height of a trailer and adaptable for attachment to the tongue of a trailer, comprising a collar attached to and oriented perpendicular to the horizontal plane of the trailer. The collar contains a bored hole and a longitudinally aligned indentation. This embodiment further includes an elongated hollow outer member i) enclosed on one end creating a cavity, ii) having a total cross section smaller than and defined by the interior cross section of the collar such that the outer member may be inserted in and slides freely through the collar with proper orientation of the elongated hollow outer member with respect to the collar, iii) a hole in the enclosed end smaller in diameter than any dimension of the inner cross section and iv) containing a plurality of longitudinally aligned holes whose diameters equal the diameter of the bored hole. The longitudinally aligned holes are situated so that when the outer member is inserted in the collar, each of the longitudinally aligned holes is capable of coincidence with the bored hole in the collar with proper vertical adjustment of the outer member. This embodiment further includes a threaded bolt with a handle attached at one end, the bolt having a diameter smaller than the diameter of the hole in the enclosed end of the outer member. The handle is positioned exterior to the elongated hollow outer member and the bolt inserted through the hole in the enclosed end of the elongated hollow outer member and extended longitudinally within the cavity of the outer member. This embodiment further comprises a hollow housing with an inner diameter equal to the diameter of the bored hole in the collar. The housing is attached to collar such that that the longitudinal axis of the housing intersects the centerpoint of the bored hole in the collar and is orthogonal to the radial vector of the bored hole in the collar. This embodiment further comprises an elongated hollow inner member having i) a total cross section smaller than and defined by the cross section of the outer member cavity so that the inner member is slideable within the cavity of the outer member, ii) a threaded connection proximate to one end enabling the inner member to be threadably connected to the outer member by inserting the end of the inner member containing the threaded connection in the outer member and engaging the threaded connection with the threaded bolt, and by rotation of the handle, operatively enabling the inner member to be extended or retracted relative to the outer member and iii) a longitudinal channel composed of a base and two sides with a width equal to the diameter of the bored hole in the collar. The channel is embedded within the exterior surface of the inner member and situated such that the longitudinal centerline intersects the longitudinal axis of the housing when the inner member is nested within the outer member when inserted in the collar. This embodiment further comprises a pin having a diameter less than the inner diameter of the housing such that the pin may be slideably received in the housing. The pin operatively enables the threadably connected inner member and outer member to be collectively secured to the trailer by aligning one of the plurality of longitudinally aligned holes in the outer member with the bored hole of the collar and inserting the end of the pin through the housing and the bored hole in the collar and through one of the longitudinally aligned holes in the outer member and into the channel of the inner member and operatively enables the threadably connected inner and outer members to be adjusted vertically relative to the trailer by extraction of the pin and repositioning of one of the longitudinally aligned holes in the outer member to coincide with the bored hole in the collar and re-insertion of the pin.

Another embodiment is directed to a trailer jack comprising a first hollow elongated member threadably and movably coupled to a threaded jack crank shaft that extends through the first elongated hollow member. This embodiment further comprises a second hollow elongated member having a plurality of spaced apart first pin openings located therethrough and along a portion of the length of the second elongated hollow member and in which the first elongated hollow member is slideably received. The second hollow elongated member is coupled to the threaded jack crank shaft. This embodiment further comprises a handle attached to the end of threaded jack shaft enabling the threaded jack crank shaft to be rotated and the first hollow elongated member thereby to be extended and retracted relative to the second hollow elongated member. This embodiment further comprises a trailer jack collar attached to a plate attached to a trailer support frame and having a second pin opening located therethrough. The first pin openings are registerable with the second pin opening as the second elongated hollow member is moved with respect to the trailer jack collar. This embodiment further comprises a spring biased locking member attached to the collar and having a first body that houses a spring biased pin and a second body handle that is rotatable with respect to the first body, the first and second bodies being movable between a first position in which the spring biased pin is received through one of the first openings and the second opening and opposing faces of the first and second bodies form an interface with each other and a second position in which the spring biased pin is retracted from one of the first openings and the second opening and the opposing faces are separated.

BRIEF DESCRIPTION OF THE DRAWINGS

Referring to the drawings in which the reference numbers represent corresponding parts throughout.

DETAILED DESCRIPTION

Figure 1:
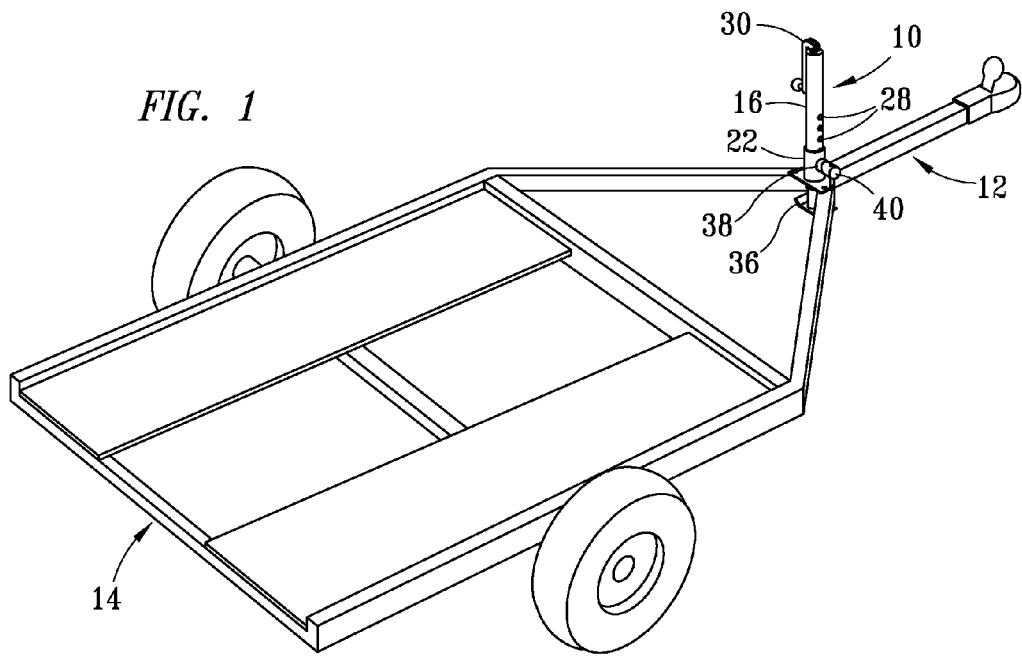
FIG. 1 is a perspective view of a trailer embodying features of the present invention, the jack being situated upon the tongue of the trailer.

FIGS. 1 through 7 show a preferred embodiment. Referring to the drawings, FIG. 1, shows a jack 10 situated on the tongue 12 of a trailer 14. In one particular embodiment shown in FIGS. 2 through 7, the jack 10 comprises a pin 20, a plate 24, a collar 22 with a longitudinally aligned indentation 44 and a bored hole 48 with a diameter larger than the diameter of pin 20 so that the pin 20 is slideable through bored hole 48. In this particular embodiment, the jack 10 further comprises an outer member 16 with a plurality of longitudinally aligned holes 28 and cross section shaped as and smaller than that defined by the inner surface of the collar 22 thereby creating a continuous longitudinal indentation 42 geometrically complementary to the indentation 44 of the collar 22. Outer member 16 is capable of insertion in the collar 22 with proper orientation. Outer member 16 is enclosed on one end 50 thereby forming a cavity 52, and a hole 54, smaller in diameter than any dimension of the interior cross section of outer member 16, is bored in the enclosed end 50. In this particular embodiment, the jack 10 further comprises an inner member 18 having a cross section shaped as and smaller than the cavity of the outer member 16 thereby creating a continuous longitudinal indentation 40. The inner member 18 contains an inset continuous longitudinal channel 46 having a width equal to the diameter of the bored hole 48. The jack 10 further comprises a hollow housing 38 with two ends, having an inner diameter equal to the bored hole 48, and a diagonal cut at one of the two ends. The jack 10 further comprises a sheath 40 encasing a portion of the length of pin 20, the sheath 40 having a complementary diagonal cut and cross section as the housing 38 on the end with the diagonal cut. This embodiment further comprises a plate 24 with a hole conforming in shape to the inner cross section of the collar 22. The plate 24 is customarily either bolted using holes 25 or welded to the upper side of the trailer 14. The collar 22 is affixed to the plate 24 so that the inner surface of the hole in the plate 24 and the inner surface of collar 22 coincide. The housing 38 is attached to the collar 22 at the end distal from the diagonal cut so that the housing longitudinal axis intersects the center point of bored hole 48 and lies orthogonal to the radial vector of bored hole 48. This particular embodiment further comprises a threaded bolt 34 with a handle 30 attached to one end. The threaded bolt 34 has a diameter smaller than the hole 54. In this particular preferred embodiment shown in FIGS. 5 and 7, the inner member 18 may be nested within the outer member 16 by orienting and overlapping the indentation 42 of the outer member 16 with the indentation 40 in the inner member 18. The threaded bolt 34 extends longitudinally in outer member 16 through hole 54, threadably engaging the threaded connection 32 of the inner member 18 and longitudinally into inner member 18 to near the lower end of the inner member 18 when the inner member 18 is in a retracted position relative to outer member 16. The threaded bolt 34 thereby secures the inner member 18 to the outer member 16 and operatively enables the inner member 18 to be extended or retracted relative to the outer member 16 by rotation of crank 30 acting on threaded bolt 34. The outer member 16 with the inner member 18 threadably connected is secured to the trailer 14 by inserting the pin 20 through the housing 38, the bored hole 48 in the collar 22, into one hole 28 of the plurality of longitudinally aligned holes in the outer member 16 and into the inset channel 46 of the inner member 18 by bringing the complementary diagonal planar surfaces of the housing 38 and sheath 40 in flush contact with each other. The outer member 16 and threadably connected inner member 18 may be adjusted up or down in height by retracting the pin 20 from the inset channel 46 in the inner member 18 and hole 28 in the outer member 16 and rotating the pin 20 to rest the sheath 40 on the housing 38. A different hole 28 is positioned to coincide with bored hole 48 in the collar and the pin 20 then rotated and positioned so that the diagonal surfaces of the housing 38 and sheath 40 are in full planar contact and the pin 20 is re-inserted through the bored hole 48 in the collar, the different hole 28 and into the inset channel 46 of inner member 18. In the preferred embodiment, the interactions between the indentations 40 and 42 and indentation 40 prevent the rotation of the outer member 16 and inner member 18 relative to each other and the combined inner 18 and outer member 16 relative to the collar 22 when the crank 30 is rotated and enables alignment of the plurality of longitudinally aligned holes 28 in the outer member 16 with the bored hole 48 in the collar 22 and the intersection of the centerline of the inset longitudinal channel 46 of the inner member 18 with longitudinal axis of the housing 38. The inset longitudinal channel 46 enables the outer member 16 with threadably connected inner member 18 to be more securely fastened to trailer 14 because the pin 20 is inserted entirely through the outer member 16 and into inset longitudinal channel 46. In other embodiments without the inset longitudinal channel 46, the pin 20 can be extended into one of the plurality of longitudinal holes 28 of the outer member 16 but only to the outer surface of the inner member 18. A footing 36 adapted for contact with ground may be attached to the inner member 18 in any embodiment. The jack 10 is depicted upon tongue 12 of trailer 14. The collar 22 of jack 10 may also be positioned to abut the side of the trailer tongue 12 of trailer 14. The inner member 18 and outer member 16 and the collar 22 may be of any complementary geometric shape. Depicted are tubular like members, but the outer member 16 and inner member 18 and collar 22 could be square, rectangular, oval, or other shape. The complementary indentations of the collar, inner member and outer member are not necessary in all embodiments.

The indentation 42 of the outer member 16 and indentation 40 of inner member 18 may be any shape, such as V-shaped, U-shaped or square-shaped, with the longitudinally aligned indentation 44 in the collar 22 complementarily shaped and sized so that the indentation 44 interfits with the indentation 42 of the outer member 16 and the outer member 16 may be properly oriented and inserted through the collar 22. The indentation 40 of the inner member 18 must be complementarily shaped and sized with the indentation 42 of the outer member 16.

Figure 2:
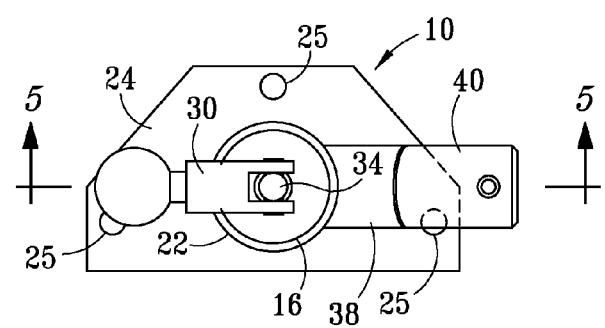
FIG. 2 is a plan view of the inner and outer member of the trailer jack of FIG. 1 inserted through the collar and triangular plate, the complementary surfaces of the sheath and housing in flush contact so that the threadably connected inner and outer members are secured to the trailer by way of the pin inserted through the housing, bored hole of the collar and the longitudinally aligned hole of the outer member and the crank handle for extending or retracting the inner member relative to the outer member is folded into the position for non-use.
Figure 3:
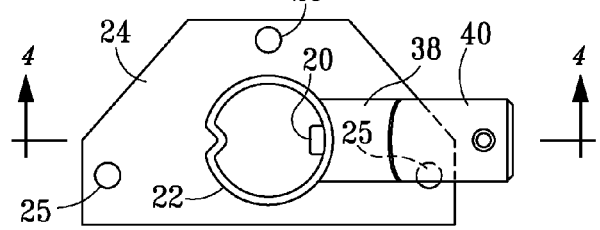
FIG. 3 is a plan view of the triangular plate of FIG. 1 and the collar of FIG. 1 with longitudinally aligned indentation in the collar, with the complementary surfaces of the sheath and housing of FIG. 2 in flush contact and the pin thereby inserted through the housing and bored hole in the collar and extending beyond the inner surface of the collar (the inner and outer members are absent from this view)
Figure 4:
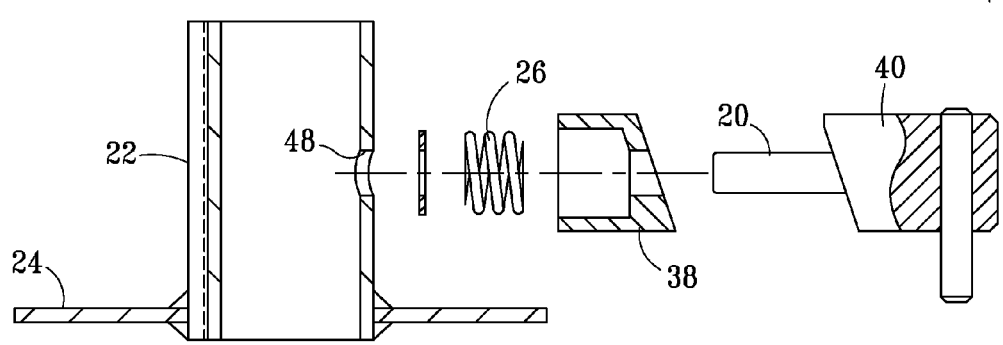
FIG. 4 is a cross-sectional exploded view of the collar, the housing, pin with sheath, spring with washer to secure the pin to the collar and plate taken along the line 4-4 of FIG. 3 showing complementary diagonal planar surfaces of the housing and sheath (the inner and outer members are absent from this view)
Figure 5:
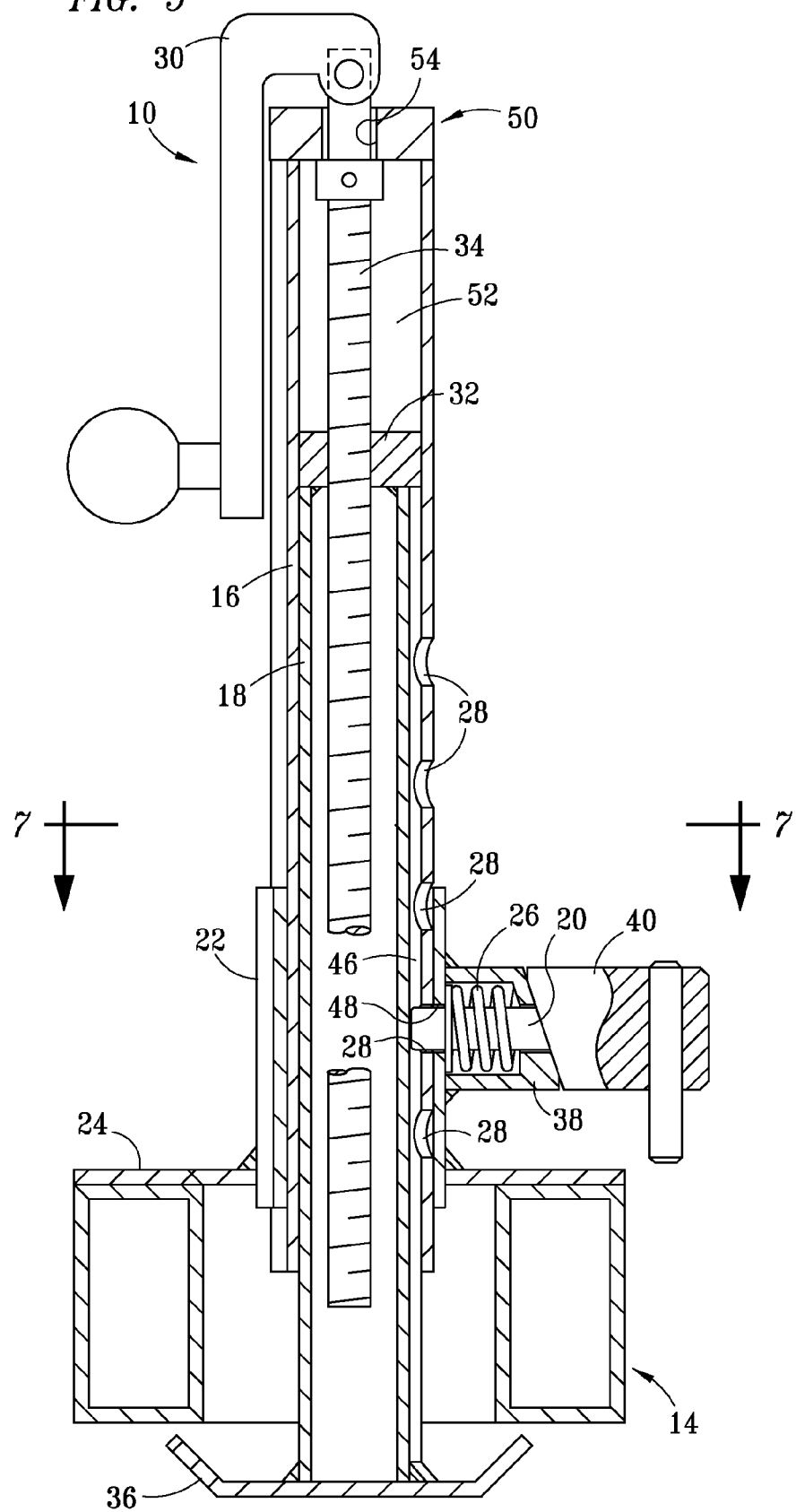
FIG. 5 is a cross sectional view of the jack attached to the trailer taken along the line 5-5 of FIG. 2 showing the pin and the housing surfaces in flush contact and the pin thereby inserted through the housing, the bored hole in the collar, one of the plurality of longitudinally aligned holes in the outer member and into the inset longitudinal channel of the inner member and the handle, the collar having a indentation and the inner and outer members having complementary indentations, the threaded connection situated in the upper end of the inner member, and the threaded bolt attached to the crank and the bolt threadably engaged with the inner member through the threaded connection, the crank shown in the position for non-use when the jack is attached to the trailer.
Figure 6:
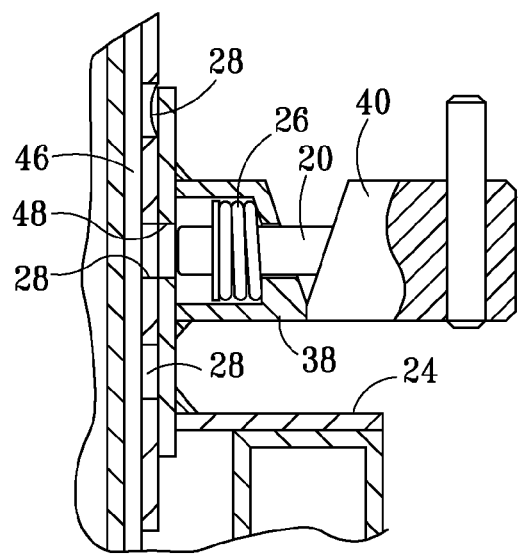
FIG. 6 is an exploded view of the housing and sheath oriented so that the complementary surfaces of the housing and sheath act to retract the pin from the inset channel of the inner member, the hole in the outer member and the bored hole in the collar.
Figure 7:
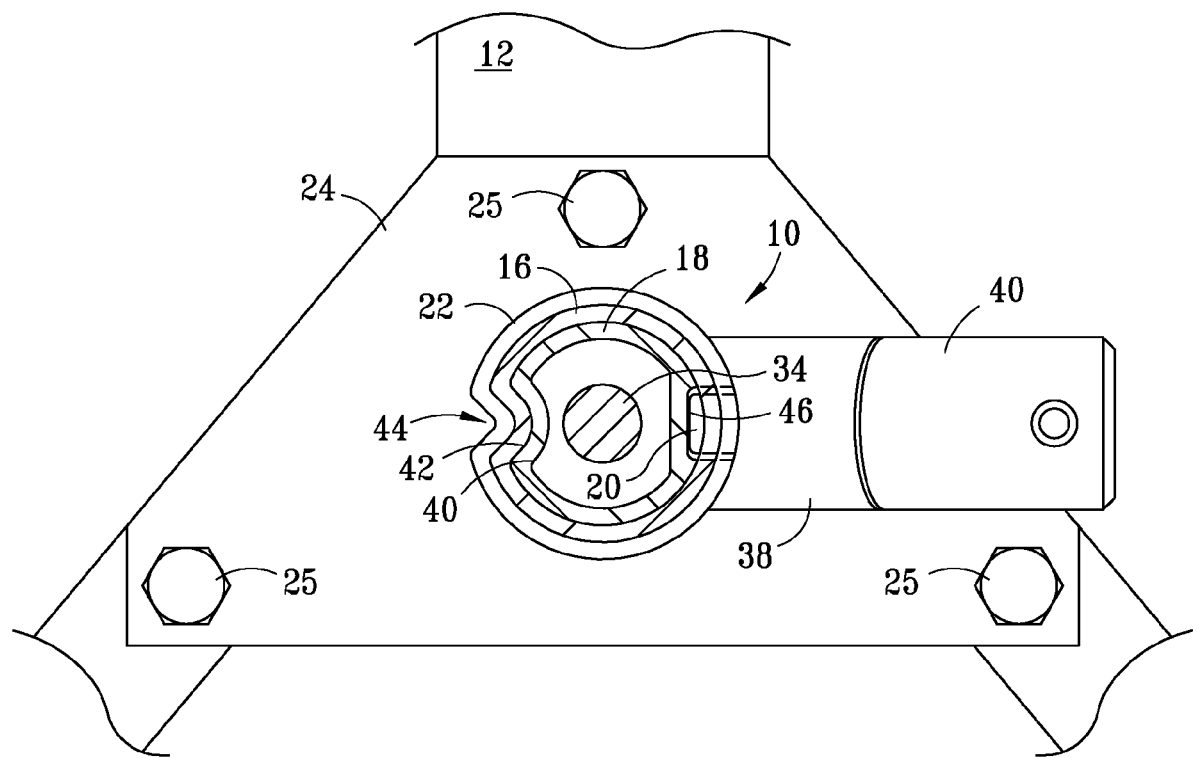
FIG. 7 is a cross-sectional explosion of the jack taken along line 7-7 of FIG. 5 showing the threadably connected inner and outer members inserted in the collar having a longitudinal indentation and the correspondingly shaped inner member and outer member, the complementary planar surfaces of the housing and sheath in flush contact and the pin inserted through the housing, the bored hole in the collar, one of the plurality of longitudinally aligned holes in the outer member and into the embedded longitudinally aligned channel of the inner member.
Figure 8:
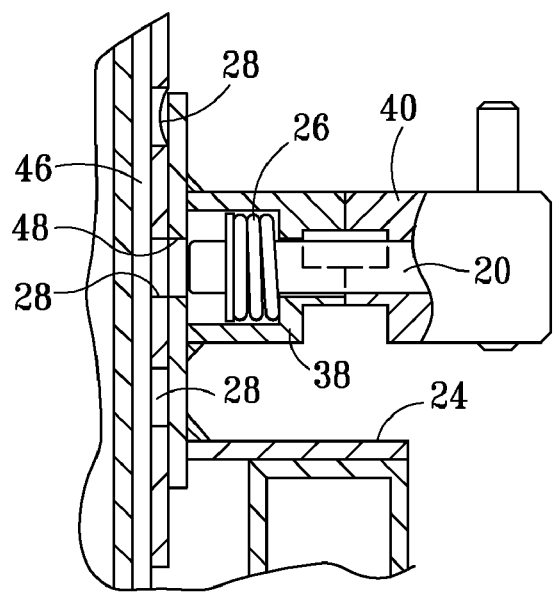
FIG. 8 is a cross-sectional exploded view of the housing and sheath each with complementary crenellated geometries, the housing and sheath oriented to retract the pin from the inset channel of the inner member, the hole in the outer member and the bored hole in the collar.
Figure 9:
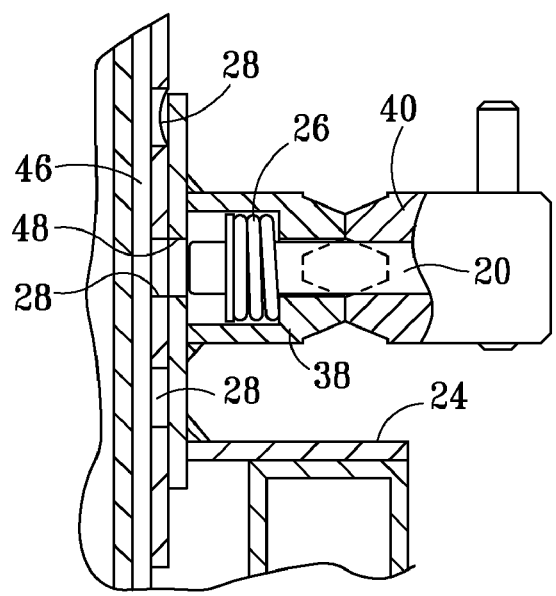
FIG. 9 is a cross-sectional exploded view of the housing and sheath each with complementary sawtooth geometries, the housing and sheath oriented to retract the pin from the inset channel of the inner member, the hole in the outer member and the bored hole in the collar.

Other embodiments for the geometrically complementary interfacing surfaces of the sheath 40 and housing 38 exist in addition to the diagonal surfaces depicted and described in the preferred embodiment. In another embodiment, as shown in FIG. 8, complementary crenellations in the sheath 40 and housing 38 could be used to achieve a complementary geometry that enables the pin 20 to be extracted from one of the longitudinally aligned holes 28, rotated and remain in a retracted position while the outer member 16 is repositioned to align with a different longitudinally aligned hole 28 and then the pin 20 is rotated and re-inserted through the preferred longitudinally aligned hole 28 through orientation of the crenellations of the housing 38 and sheath 40 with respect to each other to either rapidly raise or lower the height of the trailer 14. In another embodiment, as shown in FIG. 9, a complementary sawtooth pattern in the sheath 40 and housing 38 could be used to achieve a geometry that enables the pin 20 to be extracted from one of the longitudinally aligned holes 28, rotated and remain in a retracted position while the outer member 16 is repositioned to align with a different longitudinally aligned hole 28 and then the pin 20 is rotated and re-inserted through the preferred longitudinally aligned hole 28 through proper orientation of the sawtooth pattern of the housing 38 and sheath 40 with respect to each other to either rapidly raise or lower the height of the trailer 14. In all embodiments, the height of the trailer 14 may be adjusted through two mechanisms. Once the inner member 18 and the outer member 16 are threadably engaged with threaded bolt 34, the inner member 18 may be extended or retracted relative to the outer member 16 by rotation of the crank 30 acting on threaded bolt 34. In FIGS. 2 and 5, the crank 30 is depicted in a stored or non-use position. When in use, the crank 30 would be raised and rotated in a horizontal plane. When rotated, inner member 18 would be extended or retracted, depending upon the direction that the crank 30 is turned, by threaded bolt 34 acting on threaded connection 32. The extension and retraction of the inner member 18 relative to the outer member 16 enables the height of the trailer 14 to be adjusted in an incremental or precise manner. The height of the trailer 14 may be quickly adjusted by removal of the pin 20, reorientation of one of the plurality of longitudinally aligned holes 28 with the bored hole 48 of the collar 22 and reinserting the pin 20 to once again secure the outer member 16 and threadably engaged inner member 18 to the trailer 14. This disclosure differs from those cited in the prior art. The advantages provided herein include, without limitation, a simpler design than three piece jacks. No telescoping third element is necessary to achieve the rapid gross adjustment in height of the trailer. In particular, the rapid gross adjustment in height, either up or down, may be achieved through use of the pin 20 and collar 22 acting upon the threadably connected inner member 18 and outer member 16. The rapid gross adjustment is achieved through the interaction of the pin 20 and the threadably connected inner member 18 and outer member 16 without use of the cranking mechanism. Many conventional devices are directed to rigid fixation of the entire jack mechanism to the trailer with an element extended to make contact with the ground through a crank mechanism. To achieve a significant adjustment in height, the crank mechanism must be rotated extensively. The embodiments herein limit the crank mechanism to only the incremental adjustments in height that an operator might require thereby significantly reducing the time and effort required to raise or lower the trailer by means of the jack. The two piece combination of the inner and outer member as provided by the embodiments herein reduces complexity and the chance of malfunction and provides greater ease of manufacture and repair. In three piece conventional devices, rapid adjustment is accomplished or performed under rather than above the surface of the trailer. In the present embodiments, the mechanism to make the rapid adjustment is located above the trailer within easy reach of the operator. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:

1. A trailer jack capable of enabling rapid gross and incremental adjustments in height of a trailer and adaptable for attachment to a trailer, the trailer jack comprising:

a collar attached to and oriented perpendicular to the horizontal plane of the trailer, the collar containing a bored hole; and an elongated hollow outer member having i) an enclosed end thereby forming a cavity, ii) a total cross section smaller than and defined by the cross section of the interior of the collar so that the elongated hollow outer member slides freely through the collar, iii) a hole in the enclosed end smaller in diameter than any dimension of the inner cross section and iv) a plurality of longitudinally aligned holes whose diameters equal the diameter of the bored hole in the collar, the holes being situated so that when the outer member is inserted in the collar, each of the longitudinally aligned holes is capable of coincidence with the bored hole in the collar with proper vertical adjustment of the outer member; and a threaded bolt with a handle located at one end, the bolt having a diameter smaller than the diameter of the hole in the enclosed end of the outer member, the handle positioned exterior to the outer member and the bolt inserted through the hole in the enclosed end of the outer member and extended longitudinally within the cavity of the outer member; and an elongated hollow inner member having i) a total cross section smaller than and defined by the cross section of the cavity of the outer member so that the inner member is slideable within the cavity of the outer member, and ii) a threaded connection proximate to one end enabling the inner member to be threadably connected to the outer member by first inserting the end of the inner member containing the threaded connection in the outer member and engaging the threaded connection with the bolt and, by rotation of the handle, operatively enabling the inner member to be extended or retracted relative to the outer member; and a hollow housing with an inner diameter equal to the diameter of the bored hole in the collar, the housing attached to the collar such that the longitudinal axis of the housing intersects the centerpoint of the bored hole in the collar and is orthogonal to the radial vector of the bored hole in the collar; and a pin having a diameter less than the inner diameter of the housing such that the pin may be slideably received in the housing, the pin operatively enabling the threadably connected inner member and outer member to be collectively secured to the trailer by aligning one of the plurality of longitudinally aligned holes in the outer member with the bored hole of the collar and inserting the pin through the housing and the bored hole in the collar and into one of the longitudinally aligned holes in the outer member and operatively enabling the threadably connected inner and outer members to be adjusted vertically relative to the trailer by extraction of the pin and repositioning of one of the longitudinally aligned holes in the outer member to coincide with the bored hole in the collar and re-insertion of the pin.

2. The trailer jack of claim 1 further comprising a spring secured in the housing and attached to the pin.

3. The trailer jack of claim 2 further comprising a plate with a hole whose shape matches the inner cross section of the collar, the plate attached to the trailer and the collar attached to the plate so that the hole in the plate and the interior of the collar coincide.

4. The trailer jack of claim 3 further comprising a sheath encasing a portion of the pin, the housing and sheath having complementary interfacing geometrical cross-sections such that with the sheath in contact with the housing in one position, the pin may be inserted into one of the plurality of longitudinally aligned holes of the outer member and the threadably connected inner and outer member thereby secured to the trailer and when the pin is extracted from the longitudinal aligned hole, rotated and the sheath in contact with the housing in a second position, the pin may, at a minimum, remain retracted from a longitudinally aligned hole of the outer member enabling the outer member and threadably connected inner member to be adjusted in height with respect to the trailer.

5. A trailer jack capable of enabling rapid gross and incremental adjustments in height of a trailer and adaptable for attachment to a trailer, the trailer jack comprising:

a collar attached to and oriented perpendicular to the horizontal plane of the trailer, the collar containing a bored hole and a longitudinally aligned indentation;

an elongated hollow outer member i) enclosed on one end thereby creating a cavity, ii) having a total cross section smaller than and defined by the interior cross section of the collar such that the outer member may be inserted in and slide freely through the collar with proper orientation of the outer member with respect to the collar iii) a hole in the enclosed end smaller in diameter than any dimension of the inner cross section and iv) containing a plurality of longitudinally aligned holes whose diameters equal the diameter of the bored hole, the longitudinally aligned holes being situated so that when the outer member is inserted in the collar, each of the longitudinally aligned holes is capable of coincidence with the bored hole with proper vertical adjustment of the outer member; and a threaded bolt with a handle located at one end, the bolt having a diameter smaller than the diameter of the hole contained in the enclosed end of the outer member, the handle positioned exterior to the outer member and the bolt inserted through the hole in the enclosed end of the outer member and extended longitudinally within the cavity of the outer member; and a hollow housing with an inner diameter equal to the diameter of the bored hole in the collar, the housing attached to the collar such that the longitudinal axis of the housing intersects the centerpoint of the bored hole in the collar and is orthogonal to the radial vector of the bored hole in the collar; and an elongated hollow inner member having i) a total cross section smaller than and defined by the cross section of the outer member cavity so that the inner member is slideable within cavity of the outer member, ii) a threaded connection proximate to one end enabling the inner member to be threadably connected to the outer member by inserting the end of the inner member containing the threaded connection in the outer member and engaging the threaded connection with the threaded bolt and, by rotation of the handle, operatively enabling the inner member to be extended or retracted relative to the outer member and iii) a longitudinal channel composed of a base and two sides with a width equal to the diameter of the bored hole in the collar, the channel being embedded within the exterior surface of the inner member and situated such that the longitudinal centerline intersects the longitudinal axis of the housing when the inner member is nested within the outer member when inserted in the collar; and a pin having a diameter less than the inner diameter of the housing such that the pin may be slideably received in the housing, the pin operatively enabling the threadably connected inner member and outer member to be collectively secured to the trailer by aligning one of the plurality of longitudinally aligned holes in the outer member with the bored hole of the collar and inserting the end of the pin though the housing and the bored hole in the collar and through one of the longitudinally aligned holes in the outer member and into the channel of the inner member and operatively enabling the threadably connected inner and outer members to be adjusted vertically relative to the trailer by extraction of the pin and repositioning of one of the longitudinally aligned holes in the outer member to coincide with the bored hole in the collar and re-insertion of the pin.

6. The trailer jack of claim 5 further comprising a spring secured in the housing and attached to the pin.

7. The trailer jack of claim 6 further comprising a plate with a hole whose shape matches the inner cross section of the collar, the plate attached to the trailer and the collar attached to the plate so that the hole in the plate and the interior of the collar coincide.

8. The trailer jack of claim 7 further comprising a sheath encasing a portion of the pin, the housing and sheath having complementary interfacing geometrical cross-sections such that with the sheath in contact with the housing in one position, the pin may be inserted through one of the plurality of longitudinally aligned holes of the outer member and into the inset longitudinal channel of the inner member and the threadably connected inner and outer member thereby secured to the trailer and when pin is extracted from the inset longitudinal channel and longitudinal hole, rotated and the sheath in contact with the housing in a second position, the pin may, at a minimum, remain retracted from a longitudinally aligned hole of the outer member enabling the outer member and threadably connected inner member to be adjusted in height with respect to the trailer.

9. A trailer jack comprising:

a first hollow elongated member threadably and movably coupled to a threaded jack crank shaft that extends through the first elongated hollow member;

a second hollow elongated member having a plurality of spaced apart first pin openings located therethrough and along a portion of the length of the second elongated hollow member and in which the first elongated hollow member is slidably received and connected to the first hollow elongated member with the threaded jack crank shaft, the second hollow elongated member being coupled to the threaded jack crank shaft;

a handle attached to the end of threaded jack shaft enabling the threaded jack crank shaft to be rotated and the first hollow elongated member thereby to be extended and retracted relative to the second hollow elongated member;

a trailer jack collar attached to a plate attached to a trailer support frame and having a second pin opening located therethrough, the first pin openings being registerable with the second pin opening as the second elongated hollow member is moved with respect to the trailer jack collar; and a spring biased locking member attached to the collar and having a first body that houses a spring biased pin and a second body handle that is rotatable with respect to the first body, the first and second bodies being movable between a first position in which the spring biased pin is received through one of the first openings and the second opening and opposing faces of the first and second bodies form an interface with each other and a second position in which the spring biased pin is retracted from one of the first openings and the second opening and the opposing faces are separated.

10. The trailer jack of claim 9 wherein the first hollow elongated member contains an embedded longitudinal channel capable of receiving the spring biased pin in the first position.

* * * * *